US007643938B2

(12) United States Patent
Adachi et al.

(10) Patent No.: US 7,643,938 B2
(45) Date of Patent: Jan. 5, 2010

(54) LOCATION CONFIRMATION METHOD AND LOCATION DISPLAY SYSTEM OF CONSTRUCTION MACHINE AND SUCH CONSTRUCTION MACHINE

(75) Inventors: Hiroyuki Adachi, Tsuchiura (JP); Genroku Sugiyama, Ryugasaki (JP); Kazuhiro Shibamori, Mitsukaido (JP); Hideki Komatsu, Ibaraki (JP); Koichi Shibata, Ibaraki (JP); Hiroshi Watanabe, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 404 days.

(21) Appl. No.: 10/483,061

(22) PCT Filed: Jul. 12, 2002

(86) PCT No.: PCT/JP02/07101

§ 371 (c)(1),
(2), (4) Date: Jan. 7, 2004

(87) PCT Pub. No.: WO03/007270

PCT Pub. Date: Jan. 23, 2003

(65) Prior Publication Data

US 2004/0210371 A1     Oct. 21, 2004

(30) Foreign Application Priority Data

Jul. 12, 2001     (JP)     ............... 2001-212458

(51) Int. Cl.
*G01C 21/00*     (2006.01)
*G08G 1/127*     (2006.01)
*G08G 1/123*     (2006.01)

(52) U.S. Cl. ................ 701/213; 701/207; 340/992; 340/426.1; 340/426.19

(58) Field of Classification Search ............ 701/50, 701/207, 208, 213, 36; 180/287; 455/456.6, 455/457, 99, 67.11, 517, 508, 507; 340/426.19, 340/989, 992, 426.3, 426.11, 426.24, 429.19
See application file for complete search history.

(56) References Cited

U.S. PATENT DOCUMENTS 6,195,597 B1 *     2/2001     Yamada ............... 455/550.1

(Continued)

FOREIGN PATENT DOCUMENTS

EP     1178458 B1     6/2002

(Continued)

OTHER PUBLICATIONS

European Patent Office, "Supplementary European Search Report", European Application No. EP 02 74 6005, Mar. 11, 2009, 3 pages.

*Primary Examiner*—Thomas G Black
*Assistant Examiner*—Christine M Behncke
(74) *Attorney, Agent, or Firm*—Mattingly & Malur, P.C.

(57) ABSTRACT

A hydraulic excavator periodically measures its current location at predetermined time intervals by the GPS device in an inoperative state where its engine key is in the off position and sends the current location data and time data to a management server by a main controller and communicator. The management server receives the periodically sent location data at its communicator and successively stores it in its memory. The current location data and the measurement time data to provide a location confirmation service by a location information provider. Changes in location can be confirmed on a map, the movement of the hydraulic excavator can be tracked, and assistance can be given for confirmation of location and prevention of theft.

17 Claims, 12 Drawing Sheets

U.S. PATENT DOCUMENTS

| | | | |
|---|---|---|---|
| 6,292,724 B1 * | 9/2001 | Apsell et al. | 701/29 |
| 6,611,755 B1 * | 8/2003 | Coffee et al. | 701/213 |
| 6,650,999 B1 * | 11/2003 | Brust et al. | 701/213 |
| 6,771,188 B2 * | 8/2004 | Flick | 340/989 |
| 7,149,530 B1 * | 12/2006 | Arakawa et al. | 455/456.1 |
| 2004/0201520 A1 * | 10/2004 | Flick | 342/357.07 |

FOREIGN PATENT DOCUMENTS

| | | | |
|---|---|---|---|
| JP | 4-146853 | | 5/1992 |
| JP | 6-330539 | | 11/1994 |
| JP | 9-106499 | | 4/1997 |
| JP | 10-332390 | * | 12/1998 |
| JP | 11-96465 | | 4/1999 |
| JP | 11-96466 | | 4/1999 |
| JP | 2000-073411 | | 3/2000 |
| JP | 2001-146147 | | 5/2001 |
| WO | WO00/55827 | | 9/2000 |
| WO | WO00/55828 | * | 9/2000 |
| WO | 0146710 A2 | | 6/2001 |

\* cited by examiner

FIG. 6

LOCATION MOVEMENT DATA FORMAT

| | FIELD | Byte | EXAMPLE | DATA |
|---|---|---|---|---|
| | HEADER | 1 | | 90 or A0 |
| | DATA ID | 1 | | C0 |
| | RECORD LENGTH | 2 | 70 BYTES | |
| 71 | MODEL IDENTIFICATION CODE | 4 | 014H | 30 31 34 46 |
| 72 | MACHINE NUMBER | 3 | 999999 | 0F 42 3F |
| 73 | DIFFERENCE FROM GLOBAL STANDARD TIME | 2 | -540 MINUTES | FDE4 |
| 74 | GENERATED:YEAR(PREVIOUS) | 2 | 2000 YAER | 07 D0 |
| | GENERATED:DATE(PREVIOUS) | 2 | SEPT.15 | 09 0F |
| | GENERATED:TIME(PREVIOUS) | 3 | 09:15:00 | 09 0F 00 |
| 75 | GENERATED:YEAR(PRESENT) | 2 | 2000 YAER | 07 D0 |
| | GENERATED:DATE(PRESENT) | 2 | SEPT.15 | 09 0F |
| | GENERATED:TIME(PRESENT) | 3 | 09:15:00 | 09 0F 00 |
| 76 | LATITUDE(PREVIOUS) | 5 | NORTH 38 DEGREES 7.3792 MINUTES | 00 26 07 DE D0 |
| | LONGITUDE(PREVIOUS) | 5 | EAST 140 DEGREES 15.0414 MINUTES | 00 8C 0F 01 9E |
| 77 | LATITUDE(PRESENT) | 5 | SOUTH 38 DEGREES 7.3792 MINUTES | FF DA 07 0E D0 |
| | LONGITUDE(PRESENT) | 5 | WEST 140 DEGREES 15.0414 MINUTES | FF 74 0F 01 9E |
| 78 | "NO MOVEMENT SCHEDULED"BUTTON | 1 | | |
| | ENGINE STATUS | 1 | | |
| | NUMBER OF WAKEUPS | 1 | | |
| | INTERNAL HOUR METER | 4 | 99999.99 | 01 86 9F 63 |
| | CHASSIS HOUR METER | 4 | 99999.99 | 01 86 9F 63 |
| | REMAINING FUEL | 1 | 80% | 50 |
| | MOBILE PHONE NUMBER | 11 | 09076895010 | 30 39 30 ··· 31 30 |

# LOCATION CONFIRMATION METHOD AND LOCATION DISPLAY SYSTEM OF CONSTRUCTION MACHINE AND SUCH CONSTRUCTION MACHINE

TECHNICAL FIELD

The present invention relates to a location confirmation method and location display system of a construction machine and such a construction machine, more particularly relates to a location confirmation method and location display system of a construction machine and such a construction machine enabling the current location of a hydraulic excavator or other construction machine to be confirmed, enabling a change in location to be confirmed on a map when the construction machine moves, and helpful in prevention of theft of construction machines etc.

BACKGROUND ART

Construction work machines such as hydraulic excavators (hereinafter referred to as "construction machines") in recent years have been made more intelligent through the provision of high performance computers and high performance programs and have been made able to utilize communication satellites, the Internet, and other telecommunication lines for the transfer information, instructions, etc. between construction machines deployed at far off work sites and a central base station (center server) for systemization based on centralized control.

On the other hand, in recent years, cases of theft of hydraulic excavators have been increasing. Hydraulic excavators are deployed at far off work sites as explained above. The engines of the hydraulic excavators are stopped when not performing work and the machines left at the sites. The machines are not monitored that strictly system-wise. Therefore, they are easy to steal.

Therefore, as a conventional system for reliably preventing the theft of construction machines as explained above, for example, the "theft prevention apparatus and theft prevention system for construction machines" disclosed in Japanese Patent Publication (A) No. 2000-73411 have been proposed.

This system is a theft prevention system designed to compare identification information given to a construction machine with identification information input for operation when operating the construction machine and, when judging that the result of comparison is that they "do not match", to cut the circuit for powering up the starter circuit and the circuit for supplying hydraulics to the remote control valve for running motor operation or the feed path for feeding fuel to the engine so as to prevent the starter motor from being started up. This theft prevention system uses the special features in the design of the electrical system, hydraulic system, and fuel feed system in hydraulic excavators to make the conditions for startup more complicated and increase the difficulty of theft.

Further, in the above theft prevention system, it is possible to add to a construction machine equipped with such a theft prevention system the function of determination of the location of the construction machine utilizing a GPS (Global Positioning System) and preventing startup as explained above by sending an operation shutdown signal from a sending station to the construction machine when the construction machine is located other than at its predetermined work area. Further, it is possible to make a display of a PC of a manager of the construction machine display a map showing a circle of the work site of the construction machine, display information showing the location of the construction machine superposed on that map, and enable confirmation as to if the location of the construction machine managed by the manager is in the usual work area. When the construction machine is outside of the work area on the map, it is possible to raise an alarm and send an engine shutdown signal.

However, in the conventional theft prevention system, while it is possible to make the startup conditions of the starter motor more complicated to increase the difficulty of theft, it is not possible to completely prevent the theft. Further, while a manager can learn that the construction machine has been stolen when located outside of the work area on the map, after this it is not possible to then learn the location of the construction machine outside of the work area.

An object of the present invention, in view of the above problem, is to provide a location confirmation method and location display system of a construction machine and such a construction machine enabling the construction machine itself to periodically calculate its own current location data and send the current location data and measurement time data to enable its location and changes in location along with time to be confirmed on a map when the construction machine moves, enable movement of the construction machine to be tracked, and help confirm its location and prevent theft.

DISCLOSURE OF THE INVENTION

The location confirmation method and location display system of a construction machine and such a construction machine according to the present invention are configured as follows to achieve the above object.

The location confirmation method of a construction machine of the present invention is applied to a system comprised of a hydraulic excavator or other construction machine provided with a controller, a locator, and a communicator and deployed at a work site and a center server provided with a communicator, memory, and location information provider. The construction machine periodically measures its current location by the locator at predetermined time intervals in a non-operative state where the engine key is turned to the off position and sends the current location data and the measurement time data to the center server by its controller and communicator. The center server receives the current location data and measurement time data periodically sent from the construction machine at its communicator and successively stores them in its memory. Further, the center server provides a location confirmation service by its location information provider using the current location data and the measurement time data. The location information provider is a means for providing an interested party such as the owner of the construction machine or manager the information relating to the current location of the hydraulic machine.

According to the above location confirmation method of a construction machine, the interested party of the hydraulic excavator can immediately and easily learn the current location of the hydraulic excavator and changes in the current location along with the elapse of time. Due to this, when the construction machine moves, he can accurately determine this and track changes in location. It is possible to accurately determine even cases where a construction machine is stolen and moved, so the method can be used to help prevent theft.

The location confirmation method of a construction machine of the present invention further provides the above such location confirmation method wherein preferably the center server is provided with map data and marks a location based on the current location data and measurement time data on a map showing an area including the work site of the construction machine so as to provide a location confirmation service. Since the map shows the current location of the construction machine, it is easy to determine changes in the current location along with the elapse of time and possible to obtain accurate information relating to the current location of the construction machine.

The location confirmation method of a construction machine of the present invention further provides the above such location confirmation method wherein, preferably, in providing the location confirmation service, the map shows the state of movement of the construction machine as a discontinuous path of location marks based on the current location data and the measurement time data. Since the current location of the construction machine is marked on the map as a discontinuous path along with the time data (year, day, and time), changes in the current location can be easily understood and changes in location can be easily predicted.

The location confirmation method of a construction machine of the present invention further provides the above such location confirmation methods wherein preferably the location confirmation service prepared at the location information provider is provided to an interested party (owner, manager, etc.) of the construction machine through a communications line.

The location confirmation method of a construction machine of the present invention further provides the above such location confirmation method wherein preferably information relating to the provision of a location confirmation service is sent to a terminal of an interested party by e-mail. As the data communicated through e-mail, only information relating to the location is sent. For example, it is preferable to show this in the map information at the terminal of the interested party.

The location confirmation method of a construction machine of the present invention further provides the above such location confirmation method wherein preferably an interested party accesses the location information provider of the center server from his terminal through the Internet and confirms provision of the location confirmation service based on an advance notification from the center server to the interested party. In this case, the location information provider is constructed as a homepage for provision of location information in the center server, and the user etc. accesses it from an Internet terminal through the Internet to obtain necessary location information relating to the current location.

The location confirmation method of a construction machine of the present invention further provides the above location confirmation method wherein preferably the data sent from the construction machine to the center server includes data relating to a schedule of movement of the construction machine and a change in the current location of the construction machine is judged to be normal or abnormal based on the data relating to the schedule of movement. The data relating to the schedule of movement is produced for example by operation of a "no movement scheduled" button. When judging there is movement from a change in current location of the construction machine based on this data, it is possible to judge if the movement is inherently scheduled normal movement or abnormal movement due to theft etc.

The location confirmation method of a construction machine of the present invention, on the premise of depending upon the above location confirmation methods, is a method such that the locator is preferably a GPS unit for measuring a current location by making use of a GPS satellite.

The location confirmation method of a construction machine of the present invention further provides the above location confirmation method wherein preferably the time intervals set in the construction machine are variable in accordance with the situation. For example, when there is no change from the previously measured location, the following time intervals are set longer, while when there is a change from the previously measured location and theft or another urgent situation arises, the time intervals are shortened and the current location is confirmed more frequently. Due to this, it is possible to obtain a close grasp of the location of the construction machine at the time of theft and tracking becomes easier. When there is no urgency, the time intervals may be set longer to reduce the power consumption of the battery.

The location display system of a construction machine according to the present invention is applied to a system comprised of a construction machine provided with a controller, a locator, and a communicator and deployed at a work site, and a center server provided with a communicator, a memory, and a location information provider. The construction machine periodically measures its current location at predetermined time intervals by the locator and sends current location data and measurement time data to the center server by the controller and communicator. The center server receives the current location data and measurement time data periodically sent from the construction machine at its communicator, successively stores them in its memory, and marks the current location on a map using the current location data and the measurement time data by the location information provider.

The location display system of a construction machine according to the present invention further provides the above such location display system wherein preferably the marks relating to the current location are designed so that the state of movement of the construction machine is displayed on the map as a discontinuous path of location marks based on the current location data and the measurement time data.

The location display system of a construction machine according to the present invention further provides the above such location display system wherein preferably the marks relating to the current location prepared at the location information provider are provided to an interested party of the construction machine through a communications line.

The location display system of a construction machine according to the present invention further provides the above such location display system wherein preferably the information on the marks according to the current location is sent to a terminal of an interested party by e-mail as an attached file.

The location display system of a construction machine according to the present invention further provides the above such location display system wherein preferably the data sent from the construction machine to the center server includes data relating to a schedule of movement of the construction machine and wherein a change in the current location of the construction machine is judged to be normal or abnormal based on the data relating to the schedule of movement.

The construction machine according to the present invention is provided with a controller for controlling operations as a whole, a locator for measuring a current location, and a communicator for communicating with an external base station, which construction machine is designed to periodically measure its current location at preset time intervals by the locator in a non-operative state where the power key is in the off position and send the current location data and measurement time data to the base station side by the controller and communicator.

The construction machine according to the present invention further provides the above such construction machine wherein preferably the locator is comprised of a GPS device utilizing GPS satellites to measure its current location.

The construction machine according to the present invention further provides the above such construction machine wherein preferably the time intervals are variable in accordance with changes in the situation.

The construction machine according to the present invention further provides the above such construction machine wherein preferably the data sent to the base station includes data relating to a schedule of movement and wherein a change in current location is judged to be normal or abnormal based on the data relating to the schedule of movement.

BRIEF DESCRIPTION OF THE DRAWINGS

FIG. 6 is a view of an example of the data format of location data sent from the hydraulic excavator to a management server;

BEST MODE FOR WORKING THE INVENTION

Preferred embodiments of the present invention will be explained below based on the attached drawings.

Figure 1:
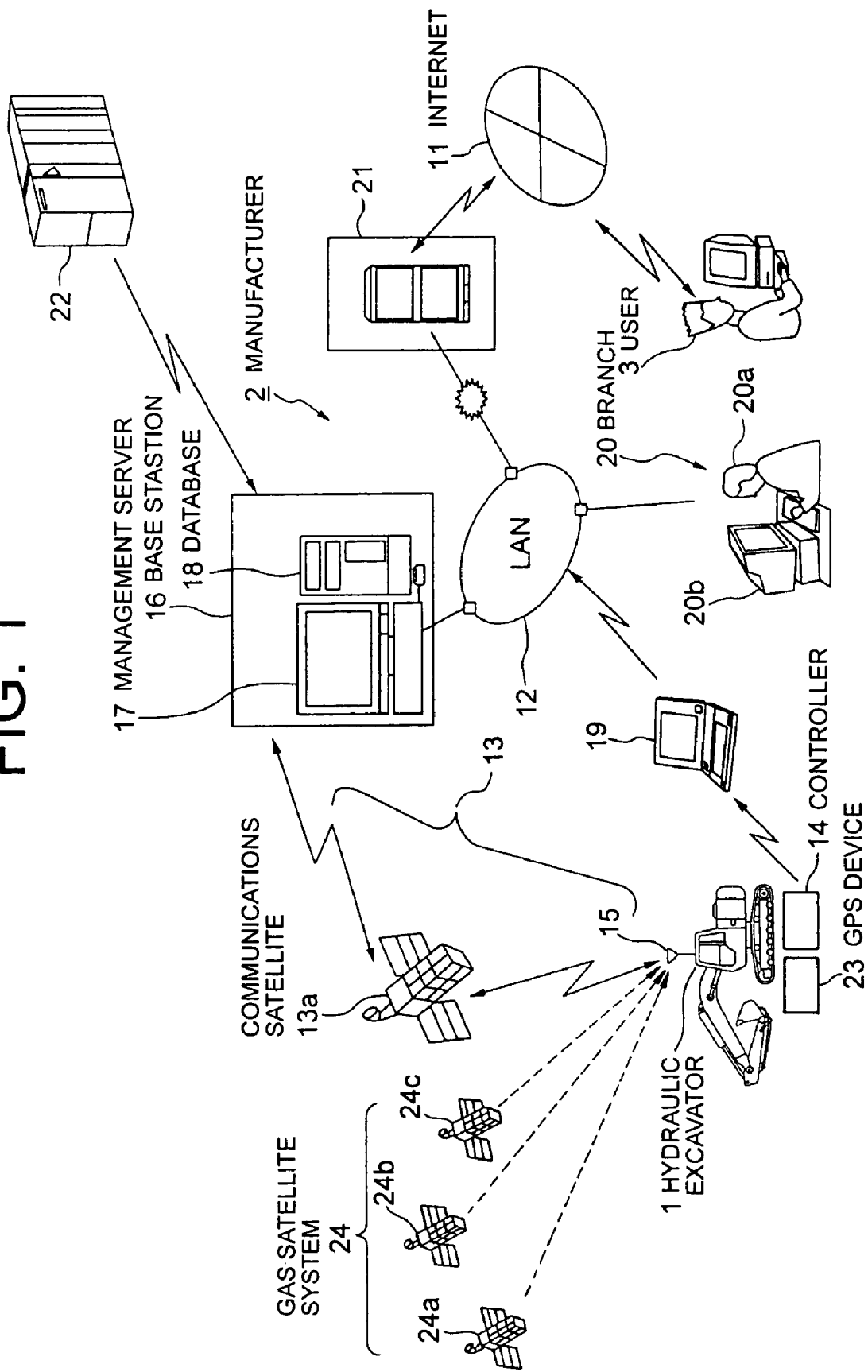
FIG. 1 is a view of the basic overall configuration of a system for management of a construction machine to which the present invention is applied.

FIG. 1 schematically shows the overall configuration of a management system for a construction machine to which the location display system according to the present invention is applied. The location confirmation method according to the present invention is applied in this location display system. In this embodiment, an example of a single hydraulic excavator 1 is shown as the work machine, and a manufacturer 2 producing and selling the hydraulic excavator 1 and a user 3 using the hydraulic excavator 1 are shown as elements of the overall system. The user 3 is the owner, manager, or other interested party of the hydraulic excavator 1 and is a customer when viewed by the manufacturer 2. The construction machine is not limited to a hydraulic excavator.

In the above overall system, the hydraulic excavator 1 is usually deployed at or near a work site at a distant location. The manufacturer 2 and user 3 are present at locations spatially and geographically far from this hydraulic excavator 1. In this overall system, the hydraulic excavator 1, the manufacturer 2, and the user 3 are linked using IT (information technology) by provision of communications lines 13 utilizing the Internet 11, an in-house LAN 12, or a communications satellite 13a.

The communications line 13 between the hydraulic excavator 1 and the later explained management server (or center server) in the above is not limited to a communications line utilizing the communications satellite 13a. For example, an ordinary amateur radio wave, marine, air, or other commercial radio wave, or general public line of mobile phones can also be utilized.

Figure 2:
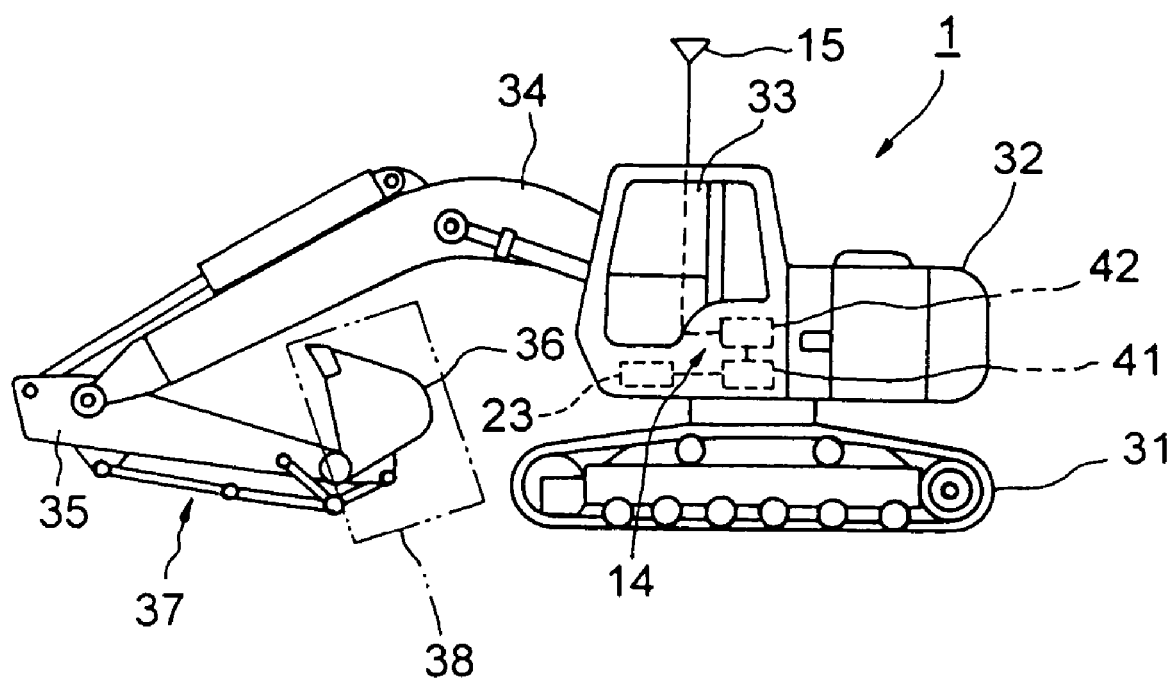
FIG. 2 is a side view of a hydraulic excavator to which the present invention is applied.

The hydraulic excavator 1 is provided with a controller 14 and a communicator including an antenna 15. In the configuration of this embodiment, as shown in FIG. 2, the communicator is provided in the controller 14.

The manufacturer 2 has a base station 16 provided with a management server 17 and a database 18. The management server 17 is positioned at the center of this system and functions as a center server. The controller 14 of the hydraulic excavator 1 deployed at the work site and the base station 16 of the manufacturer 2 are connected to enable downloads utilizing a notebook PC 19 used by a service staff etc. and transfer of the necessary information (or data) through an in-house LAN 12 or through a communications line 13.

Note that the above PC 19 is not limited to one of the service staff and may also be another PC such as one for the staff of the user owning and managing the hydraulic excavator 1.

The information (data relating to state of operation) generated at the time of operation of the hydraulic excavator 1 and information (location information etc.) relating to the hydraulic excavator at the time of operation and non-operation are all sent to the management server 17 of the base station 16 through the communicator and processed and stored there without regard as to operation or non-operation of the hydraulic excavator 1. For the information sent from the hydraulic excavator 1, the management server 17 when necessary sends information to the hydraulic excavator 1 and/or user 3. The state of operation, the settings, location information, and other information of the hydraulic excavator 1 are stored and managed in the database (or memory) 18. Further, the management server 17 sends to the hydraulic excavator 1 any necessary information at suitable timings by a one-directional mode. The communication in this one-directional mode is performed, for example, when setting a new version of software or changing settings of parameters.

The manufacturer 2 is linked with a branch 20 through the in-house LAN 12. Therefore, the sales staff or the service staff 20a in the branch 20 can use an input terminal 20b provided there to access the management server 17 and the database 18 to search for data required for work for troubleshooting or quality information and take it out and use it. Further, the manufacturer 2 is provided with an external use server 21 connected to its in-house LAN 12. It can use this external use server 21 to provide or present necessary information to the user 3 through the Internet 11 and make various recommendations regarding the method of use of the hydraulic excavator and maintenance. Note that the management server 17 of the base station 16 is connected to a separately provided computer 22 storing test data (repair and inspection information or part replacement information). The data stored in the computer 22 is also suitably downloaded to the management server 17 and stored in the database 18.

Further, the hydraulic excavator 1 is equipped with a GPS device 23. The GPS device 23 is provided with a GPS controller, a transceiver, and an antenna. This GPS device 23 is a locator which receives signals given from at least three orbiting satellites 24a, 24b and 24c of a GPS satellite system 24 and utilizes these signals to measure the current location of the hydraulic excavator 1. The current location is measured at suitable time intervals deemed necessary. Current location data of the hydraulic excavator 1 measured at the predetermined time intervals by the GPS device 23 is sent to the controller 14 and stored in a memory built into the controller 14 together with measurement time data. The controller 14 further sends the data of the current location and measurement time to the management server 17 of the base station 16 at predetermined transmission timings utilizing the data processing function and communications function of the controller 14 and the communications line 13. The data relating to the current location of the hydraulic excavator 1 is prepared in the "location movement data format" explained later and is sent as data of the location movement. Further, the transmission timings can be kept as constant periods or the intervals of the transmission timings can be changed in accordance with need.

In the above configuration, instead of the manufacturer 2, a company resembling the same can also run the base station 16 where the management server 17 and database 18 are provided. A dealer, rental company, lease company, used machinery sale and management company, etc. can be mentioned as such a company.

FIG. 2 shows enlarged a side view of the hydraulic excavator 1. The hydraulic excavator 1 is provided with an undercarriage 31 running by a hydraulic motor, a top turret 32 where the engine, hydraulic pump, hydraulic piping, power battery, and operator cabin 33 are provided, and a front mechanism 37 comprised of a boom 34, arm 35, and bucket 36. The bucket 36 is the work mechanism 33 and is freely replaced or changed in accordance with the work at the user. This hydraulic excavator 1 is for example provided with the above controller 14, antenna 15, and GPS device 23 at the operator cabin 33. The controller 14 is comprised of a main controller 41 and communicator 42. The GPS device 23 is connected to the main controller 41.

There are actually a large number of the hydraulic excavators 1 shown in FIG. 1 and FIG. 2 deployed at a large number of work sites under the management of the management server 17. These large number of hydraulic excavators 1 basically have the same configurations as that explained earlier.

Figure 3:
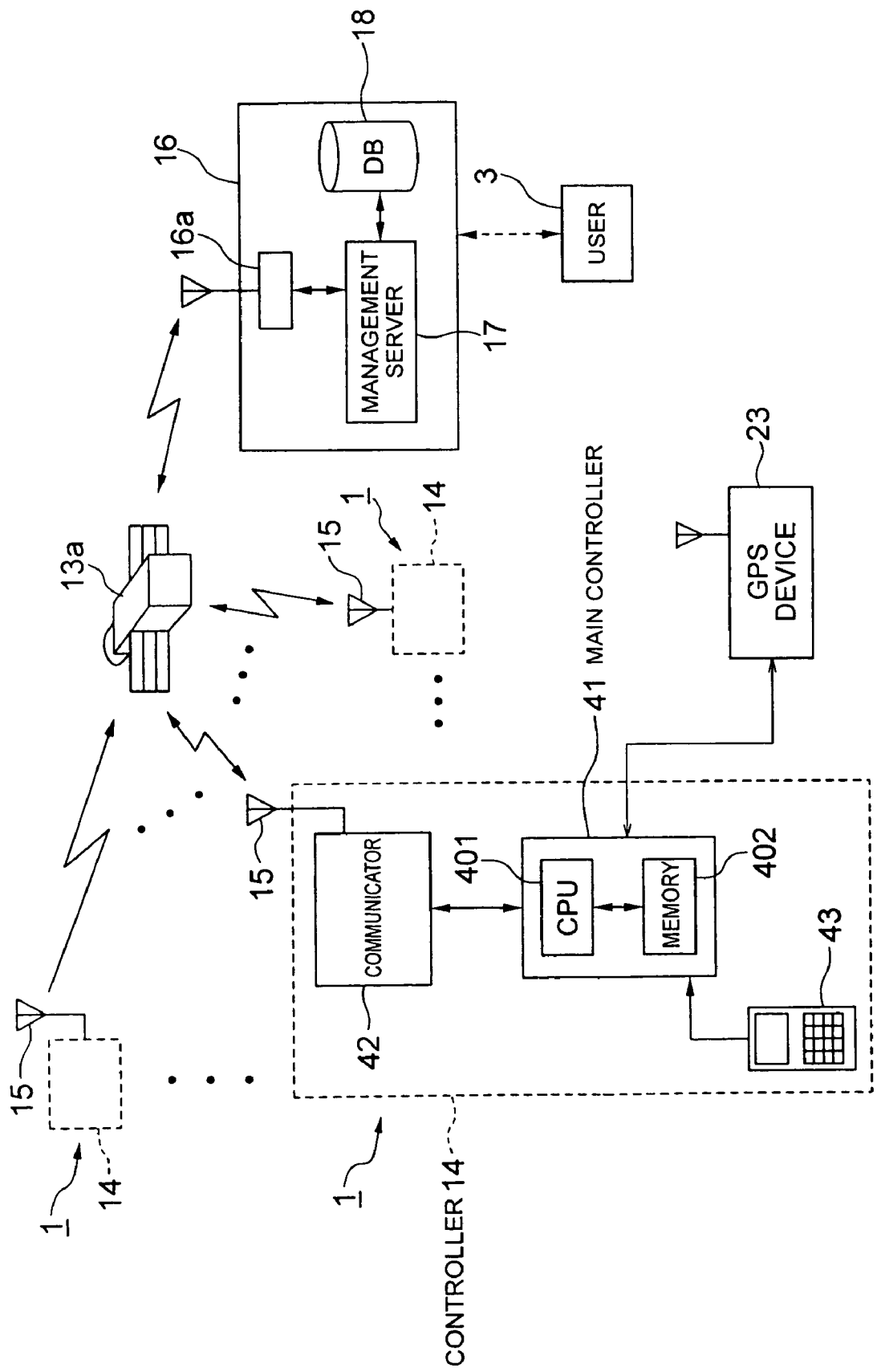
FIG. 3 is a view of the important parts of a communication system of a system to which the location display system of a construction machine according to the present invention is applied.

FIG. 3 is a view schematically showing the relationship between the large number of hydraulic excavators 1 deployed at the large number of work sites and the base station 16. The controller 14 of each hydraulic excavator 1 is provided with a main controller 41, a communicator 42, and an antenna 15. Further, each controller 14 is additionally equipped with a GPS device 23 mounted at each hydraulic excavator 1. The base station 16 is provided with a communicator 16a, a management server 17, and a database (DB) 18. The main controller 41 may, if necessary, have connected to it for example a tenkey pad 43 for giving information (content of changes or replacement) to the main controller 41. The controllers 14 of the large number of hydraulic excavators 1 shown in FIG. 3 and the management server 17 of the base station 16 have communication lines formed between them by a communication satellite 13a through which they transfer information.

Figure 4:
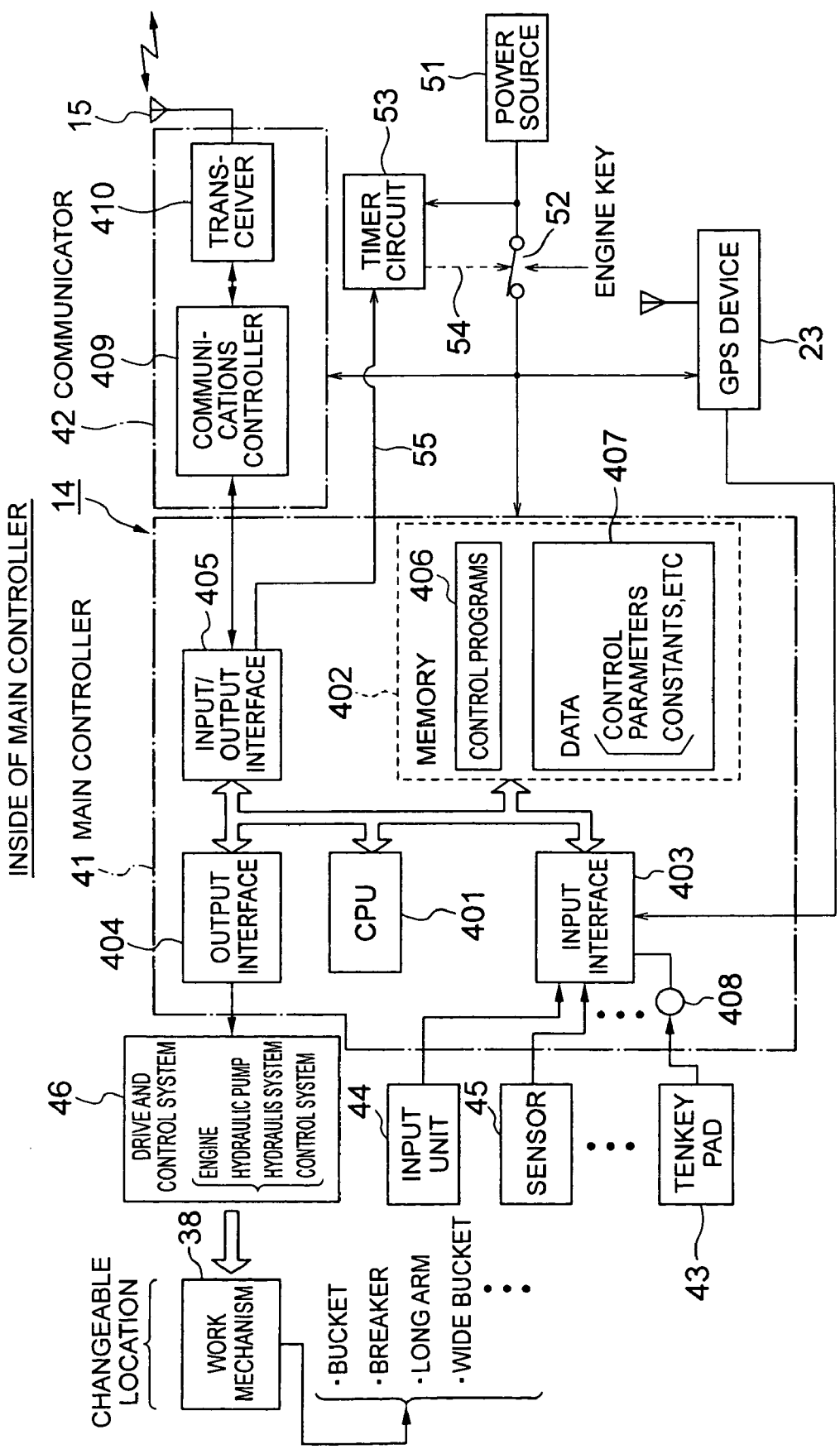
FIG. 4 is a block diagram of the internal configuration of a main controller and the configuration of related peripheral parts in a system to which the location display system according to the present invention is applied.

Next, the internal configurations of the main controller 41 and communicator 42 and the configurations of their peripheral parts will be explained in detail next with reference to FIG. 4.

The main controller 41 is provided with a CPU (central processing unit) 401, memory 402, input interface 403, output interface 404, and input/output interface 405. The memory 402 stores a plurality of control programs 406 for various types of work operations, operations for preventing theft, receipt and storage of current location data from the GPS device 23, preparation of the data format relating to the current location, periodic or irregular transmission of the data format (location information, measurement time, etc.) and the data necessary for control of the work operations etc. (control parameters and constants etc.) 407.

The input interface 403 receives as input signals output from the input unit 44 on the control panel provided in the operator cabin and the plurality of sensors 45 provided at different parts of the hydraulic system or electrical system of the hydraulic excavator 1. The input unit 44 includes an engine key (power key) 9 for turning the engine on and off and the later explained "no operation scheduled" button etc. Further, the input interface 403 has a connection terminal 408. This connection terminal 408 may be connected with the above-mentioned tenkey pad 43 in accordance with need.

Further, the above-mentioned input interface 403, as explained above, receives as input current location data of the hydraulic excavator 1 measured by the GPS device 23. Normally, it is possible to obtain time data relating to the global standard time from the orbiting satellites of the GPS satellite system 24, so along with the current location data, the measurement time data is also given to the CPU 401 through the input interface 403. The CPU 401 stores the current location data and the measurement time data given from the GPS device 23 so as to be included in the portion of the data 407 of the memory 402.

Further, the main controller 41 is connected to the above communicator 42 through the input/output interface 405. The communicator 42 includes a communications controller 409 and transceiver 410. A drive and control system 46 is connected through the output interface 404. The CPU 401 gives the drive and control system 46 instructions instructing its operation or settings. The operation of the drive and control system 46 is controlled based on these instructions or settings, whereby the bucket 36 or other work mechanism 38 provided at the front end of the front mechanism 37 is made to perform the operations necessary for work. As the work mechanism 38, in addition to a bucket, a breaker, fine crusher, rough crusher, etc. may be mentioned. The work mechanism 38 may be freely attached or detached to or from the front mechanism 37 in accordance with the required work and is used as an attachment.

As examples of the control program 406 stored in the memory 402, there are a program for control for preventing interference in accordance with the type of the hydraulic excavator 1, a program for control for restricting areas, a program for control of the posture of the work machine, a program for control of the operating characteristics of the hydraulic pump (maximum flow rate of pump), etc. Further, in the present embodiment, the control programs 406 include a program for preparing the location movement data format and sending it to the management server 17. Further, as examples of the data 407 stored in the memory 402, the various dimensions of the front mechanism 37, the interference prevention region, and parameters of the control gain, maximum tilt angle of the pump, and engine speed may be mentioned. Further, the data 407 includes the above-mentioned current location data and measurement time data.

The electrical system parts of the main controller 41, communicator 42, GPS device 23, etc. are supplied with the necessary power from a power source 51 and held in the operative state. Usually, the power from the power source 51 is input to the various electrical circuits when the switch 52 is turned on along with the operation of turning the engine key to the on position. Therefore, when the engine key is turned to the off position, the switch 52 also is turned off and the electrical system parts become inoperative in state. In the present embodiment as well, however, when the engine key is turned to the off position and the switch 52 is turned off or held in the off state, an on control signal 54 is given from a timer circuit 53 continually held in the operative state delayed by a constant time or periodically so as to place the main controller 41 etc. in the operative state for a constant time (wakeup state). Note that the time interval at which the on control signal 54 set in the timer circuit 53 is output can be freely changed in accordance with need based on a time interval change instruction signal 55 from the main controller 41.

Next, the location display system and location confirmation method for the hydraulic excavator 1 having the above configuration will be explained with reference to FIG. 5 to FIG. 9. The location display system and location confirmation method are useful for confirmation of the location of the hydraulic excavator 1 and are helpful in preventing theft.

In the present embodiment, it is assumed that, at the work site, the hydraulic excavator 1 is in the operative state until 18:00 and the engine key is turned to the on position to supply power from the power source 51 to the different parts and perform the work. At 18:00, the engine key is turned to the off position and the work by the hydraulic excavator 1 is ended. In this state, usually the hydraulic excavator 1 is left at the work site and the work started again the next day. Further, it is also possible to load the hydraulic excavator 1 on a truck and move it to another location due to a change of the work site, movement to a storage location, or other reasons.

After the engine key is turned to the off position, the switch 52 is kept in the on state for a certain time (for example, two hours), so power is supplied from the power source 51 to keep the main controller 41, communicator 42, GPS device 23, etc. in the operative state. Therefore, the main controller 41 of the hydraulic excavator 1 can measure the location of the hydraulic excavator 1 and the current location of the hydraulic excavator 1 can be monitored.

Figure 5:
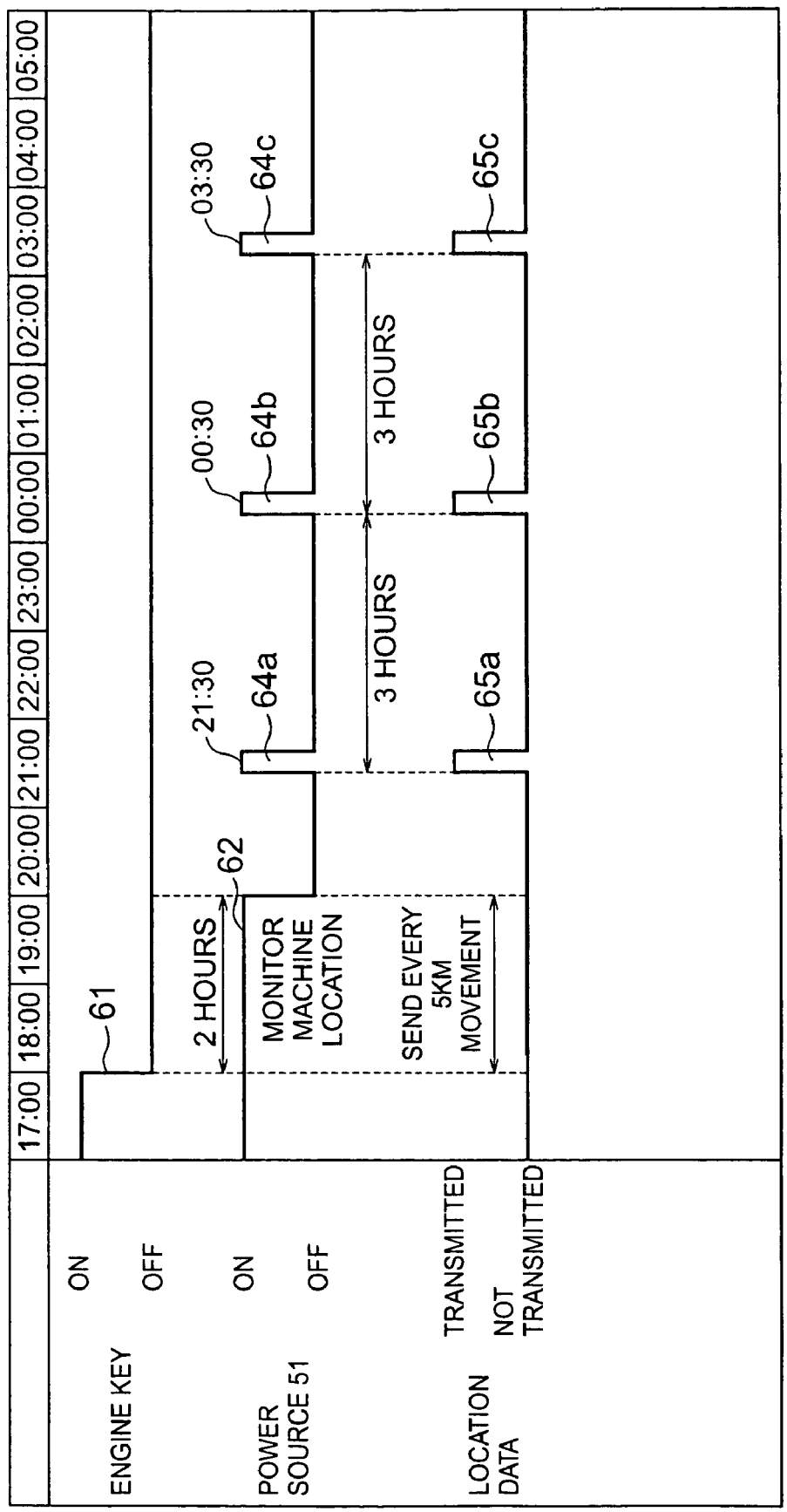
FIG. 5 is a timing chart of the state of transmission of location data for realizing the location confirmation system and location display system according to the present invention.

FIG. 5 shows the turning of the engine key to the on and off positions, the turning of the power source 51 on and off, and the transmission and non-transmission of location data by a time series. The abscissa shows the time from 17:00 to 05:00 of the following day. As shown in FIG. 5, even when the engine key is turned to the off position (18:00, reference numeral 61), the power source 51 remains in the on state for two hours more (reference numeral 62). During the two hours when the power source 51 is in the on state, the main controller 41, GPS device 23, and communicator 42 are held in the operative state. Therefore, in the hydraulic excavator 1, even if the engine key is turned to the off position and the machine is in the inoperative state, the hydraulic excavator 1 can measure its current location and send that location information to the base station 16 for two hours after the engine key is turned to the off position. In the present embodiment, when the current location of the hydraulic excavator 1 measured by the GPS device 23 is a predetermined distance away from the last measured value (for example, 5 km), the location data relating to that current location is sent to the management server 17 of the base station 16 by the location movement data format. Therefore, when the hydraulic excavator 1 is in motion, a transmission is made every 5 km of movement. After the elapse of two hours from when the engine key is turned to the off position, the switch 52 is turned off and the supply of power from the power source 51 is stopped.

After this, the timer circuit 53 outputs an on control signal 54 to the switch 52 every three hours, whereby power is supplied from the power source 51 to the main controller 41, GPS device 23, and communicator 42. As a result, the main controller 41, the GPS device 23, and the communicator 42 become operative and an operation is performed based on the flow chart shown in FIG. 8 to measure the current location of the hydraulic excavator 1 and send the location data to the management server 17.

Figure 8:
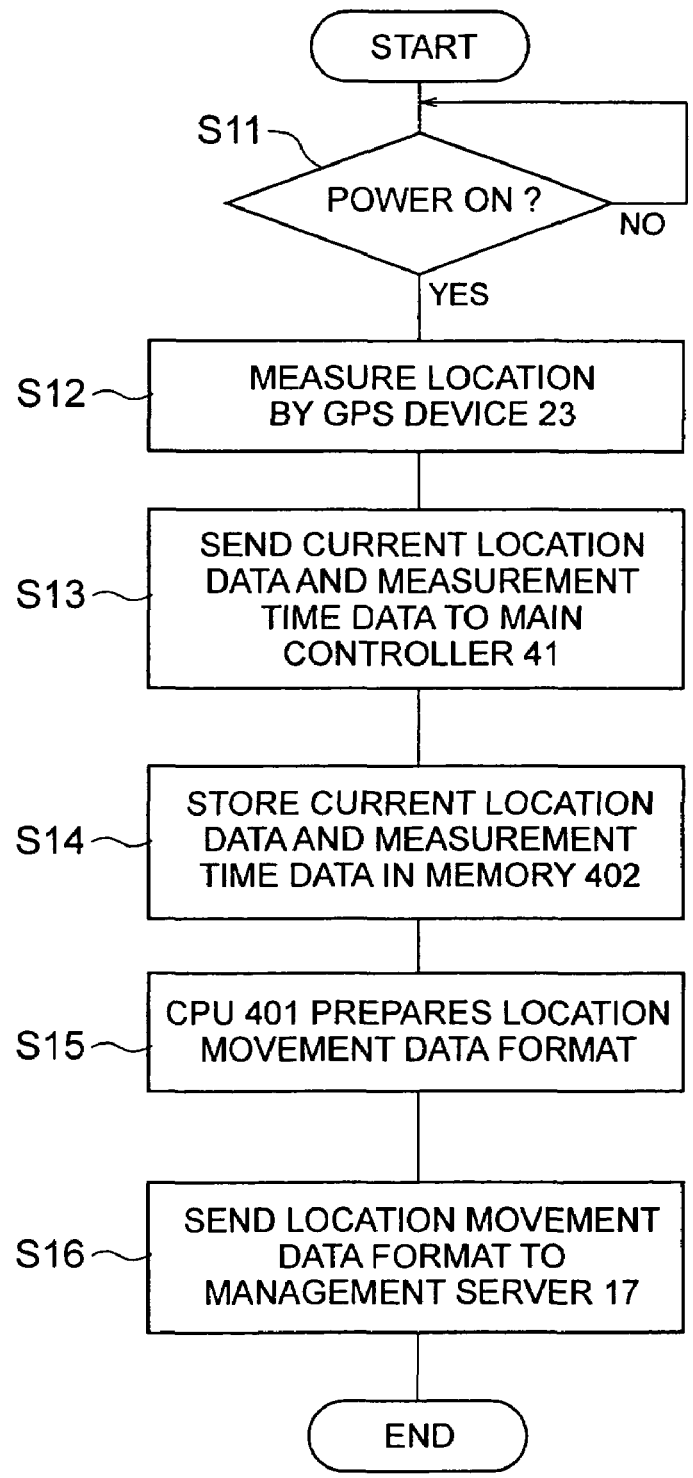
FIG. 8 is a flow chart of the operation of measurement and transmission of the current location in the hydraulic excavator.

The operation of measurement and transmission will be explained in accordance with FIG. 8. When power is supplied from the power source 51 (step S11), the GPS device 23, as explained above, measures the current location (longitude and latitude) of the hydraulic excavator 1 utilizing the GPS satellite system 24 (step S12) and sends the current location data and measurement time data (year, date, and time, global standard time) obtained from the signals of the orbiting satellites to the main controller 41 (step S13). The CPU 401 of the main controller 41 receives the current location data and measurement time data sent from the GPS device 23 and stores them in its memory 402 (data 407) (step S14). After this, the CPU 401 prepares the location movement data format using the current location data and measurement time data (step S15).

An example of the configuration of the location data format is shown in FIG. 6. This location data format includes, as data fields, from the top, a header, data ID, and record length. Further, it includes a model identification code 71, machine number 72, time difference 73 from the global standard time, time data 74 relating to the previous measurement of current location, time data 75 relating to the current measurement of the current location, location data (longitude and latitude) 76 of the previous current location, location data (longitude and latitude) 77 of the present current location, state 78 of the "no movement scheduled" button, engine status, number of wakeups, internal hour meter, chassis hour meter, remaining fuel, mobile phone number, etc.

In the above, the location data of the present current location is sent carried in the field 77 and the time of measurement of the present current location in the field 75. Due to this, the management server 17 side of the base station 16 acquires the location data relating to the current location of the hydraulic excavator 1 together with the time data and stores it in the database 18. Further, the content of the field 78 relating to the "no movement scheduled" button is data showing whether the "no movement scheduled" button provided in the operator cabin was pushed by the operator when the work by the hydraulic excavator 1 was ended. When the "no movement scheduled" button was pushed, the field 78 carries "1", while when it was not pushed, it carries "0". When the field 78 relating to the "no movement scheduled" button shows "1", this informs the interested parties that the hydraulic excavator 1 will not be moved from the work site until at least the next operation. Therefore, when the location movement data format having the field 78 indicating "1" and having the fields 76 and 77 indicating location data of a change in current location is sent, it is possible for the management server 17 side to judge that the hydraulic excavator 1 has been stolen or another abnormal situation has arisen. Note that the field 78 is not essential, but it is useful for quickly and accurately judging if theft has occurred.

In the location movement data format, the number of bytes, examples of content, and data are shown for the above fields.

The location movement data format prepared by the CPU 401 as explained above is sent to the management server 17 of the base station 16 through the communicator 42 (step S16). This series of operations is shown in FIG. 5.

The power source 51 is turned on when the hydraulic excavator 1 is in the non-operative state after the elapse of two hours from when the engine key was turned to the off position and then every three hours (routines 64a, 64b, 64c and the like). The current location is measured and sent in the manner explained above corresponding to this (routines 65a, 65b, 65c and the like).

The power source 51 is turned on, the main controller 41 etc. are made operative, and the current location is measured and transmitted every three hours for example as explained above so as to prevent the power source 51 from being drained. The operation for measurement and transmission of the current location in the non-operative state of the hydraulic excavator 1 is preferably set to be effective for two days.

According to the above configuration, the base station 16 side can confirm the current location of the hydraulic excavator 1 at a work site at a far off position and can make a good guess as to the situation by changes in the current location. Further, the management server 17 of the base station 16 can utilize the location data (longitude and latitude) of the hydraulic excavator 1 to display the current location of the hydraulic excavator 1 on a display screen. The content of the confirmation of location and the content of the display of the current location can be provided to the user 3 etc. through a communication means. The above confirmation of location and display of the current location are performed for all other hydraulic excavators as well.

Figure 7:
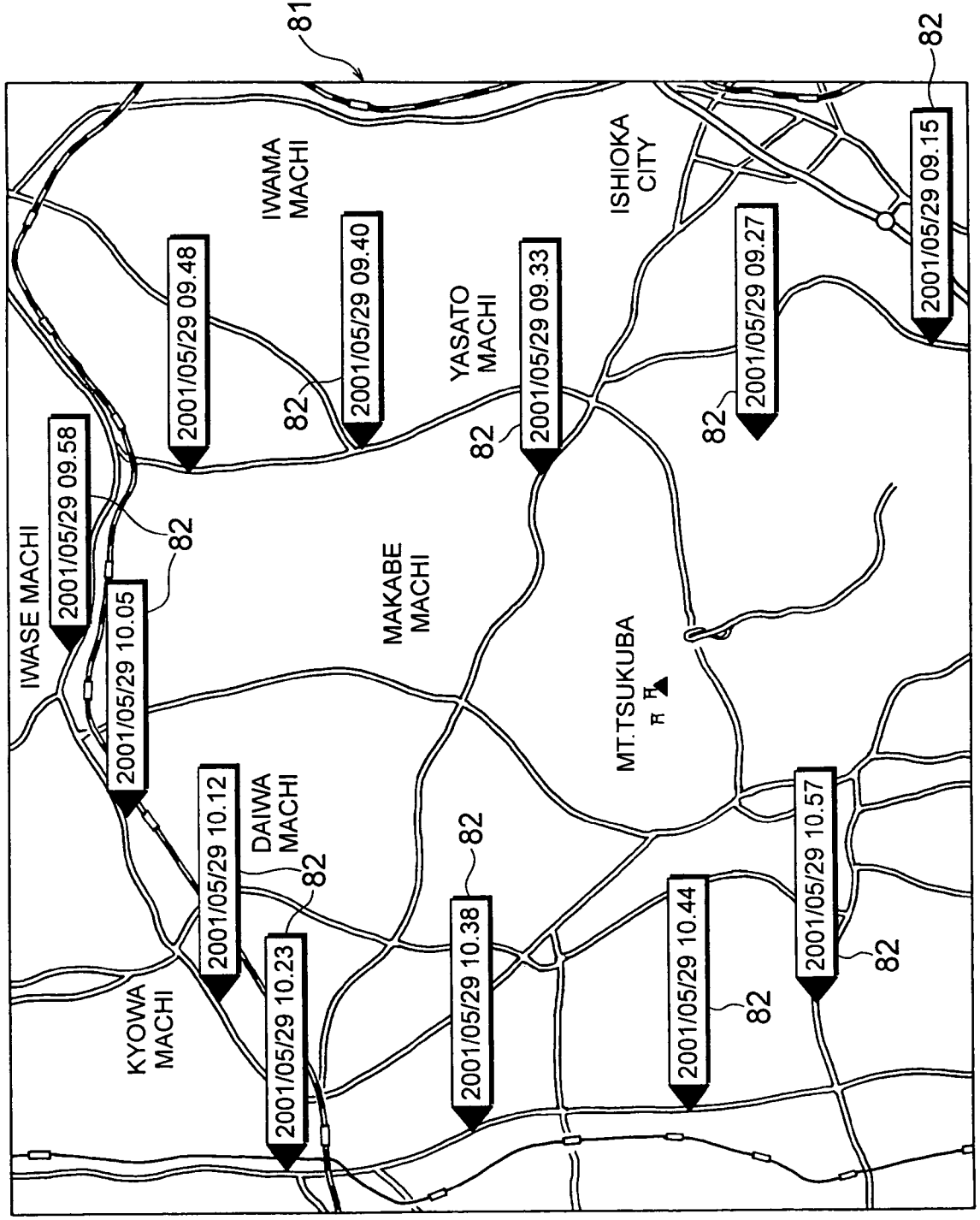
FIG. 7 is a view of the state of change of the current location on a map when the hydraulic excavator is moving.
Figure 9:
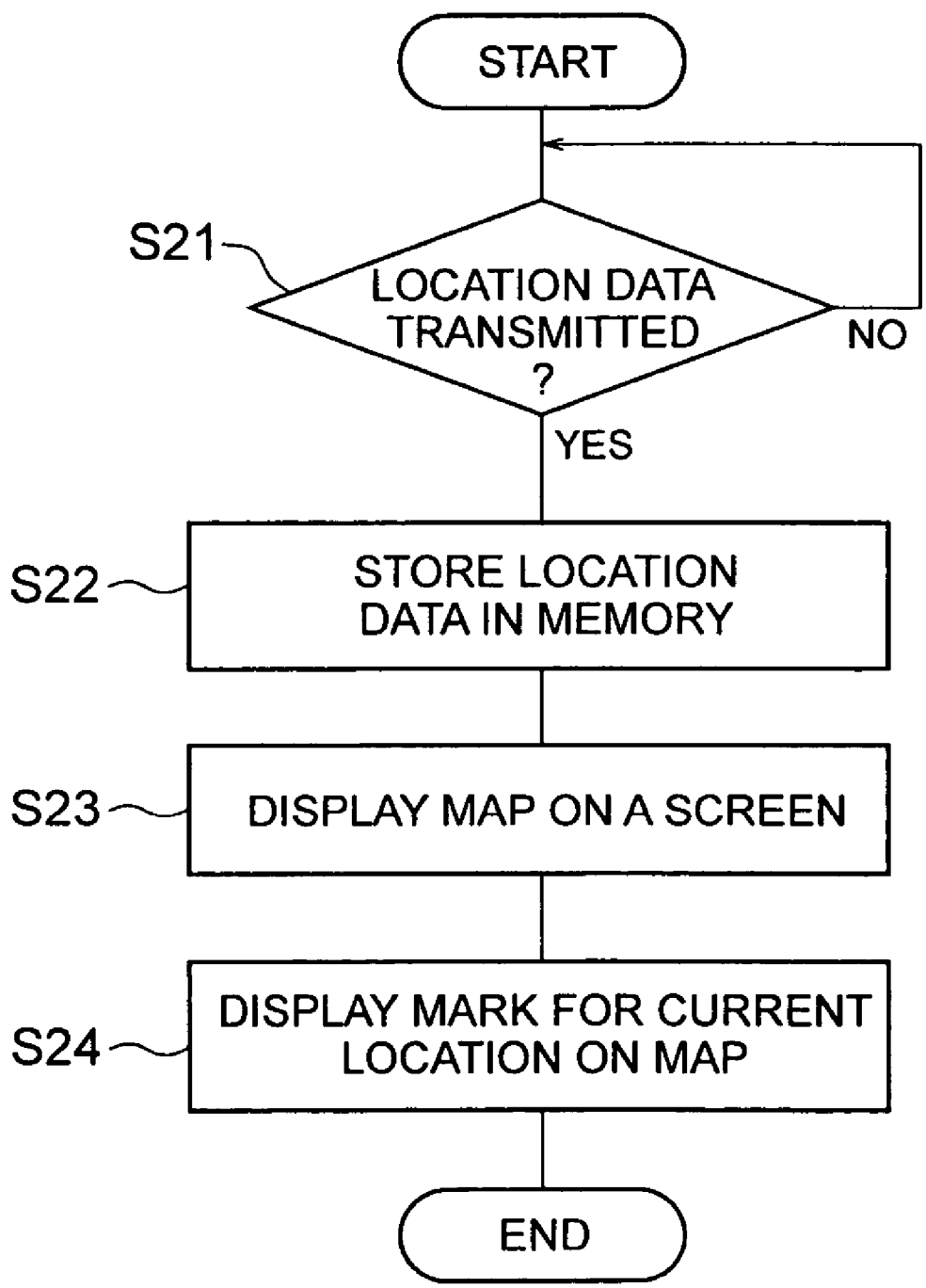
FIG. 9 is a flow chart of the operation of displaying the current location on a map in a management server.

Next, an example of the location display at the management server 17 side of the base station 16 will be explained with reference to FIG. 7 and FIG. 9. The management server 17 for example is provided in advance with map data of Japan as a whole in its memory. Therefore, when the hydraulic excavator 1 side sends location data in the location movement data format as explained above (step S21), the management server 17 stores the location data in its database (memory) 18 as explained above (step S22), then calls up the map data of the area relating to the location of the hydraulic excavator 1, displays a map on the display screen (step S23), and displays the current location of the hydraulic excavator 1 together with the time data as a mark matching with the longitude and latitude on the map (step S24). The location data is sent from the hydraulic excavator 1 side every three hours as explained above, so at the judgment step S21, it is judged if there was a transmission of location data. When there was a transmission of location data, the above steps S22, S23 and S24 are repeated. As a result, marks 82 of the trend in current location of the hydraulic excavator on the map 81 as shown in FIG. 7 are displayed as a discontinuous path. The marks 82 showing the current location display the time data of when the current location was obtained by numerical values. It is possible to easily determine the state of movement by the change in the location of the marks 82 relating to the current location along with the elapse of time.

When the hydraulic excavator 1 moves, that movement is sometimes normal and sometimes abnormal such as due to theft. This can be differentiated by the "no movement scheduled" button as explained above. For example, in the case of normal movement where a truck is used to move the machine from a first work site to a second work site, according to the display system of the current location utilizing a map, it is possible to determine where the machine is being moved to at a current time. This is extremely convenient. According to this location confirmation method and location display system, a person waiting on site can determine about what time the hydraulic excavator 1 will arrive.

As explained above, the information relating to the location of the hydraulic excavator 1 (information relating to map showing marks 82 of current location) is prepared and provided by the location information provider in the management server 17. This location information provider, as explained above, has the function of providing the thus prepared information relating to the location to the user 3.

In order for the user etc. to obtain this information on site, it is necessary to inform the user 3, in particular the manager of the work site etc., of the display of the current location on the map prepared by the location information provider of the management server 17 in this way. Therefore, the location information provider preferably is designed to send a map showing the current location from the management server 17 to a terminal of the user 3 (PC) by e-mail as an attached file. In order for the user 3 side or the site side to obtain the map information as shown in FIG. 7, it is also possible for the user side to access a homepage prepared by the management server 17 of the base station 16, specify the hydraulic excavator, and perform the required authentication procedure. In this case, the location information provider provides the homepage. Further, a user already having map data may be provided with only location data and time data.

On the other hand, when movement of the hydraulic excavator 1 is abnormal as a result of theft etc., it is possible to immediately determine this by the content of the data of the "no movement scheduled" button field 78, so the management server 17 immediately sends an instruction to the main controller 41 side to first further shorten the time intervals of turning on power and sending location data and makes the hydraulic excavator 1 measure and send its current location in more detail at shorter time intervals. At the same time, it is utilized to issue an alarm etc. to the user 3 and track the machine.

It is possible to set the time intervals for turning on the power source 51 and measurement and transmission of location data to several types at the time when turning the engine key of the hydraulic excavator 1 to the on position and in the inoperative state after turning it to the off position.

Figure 10:
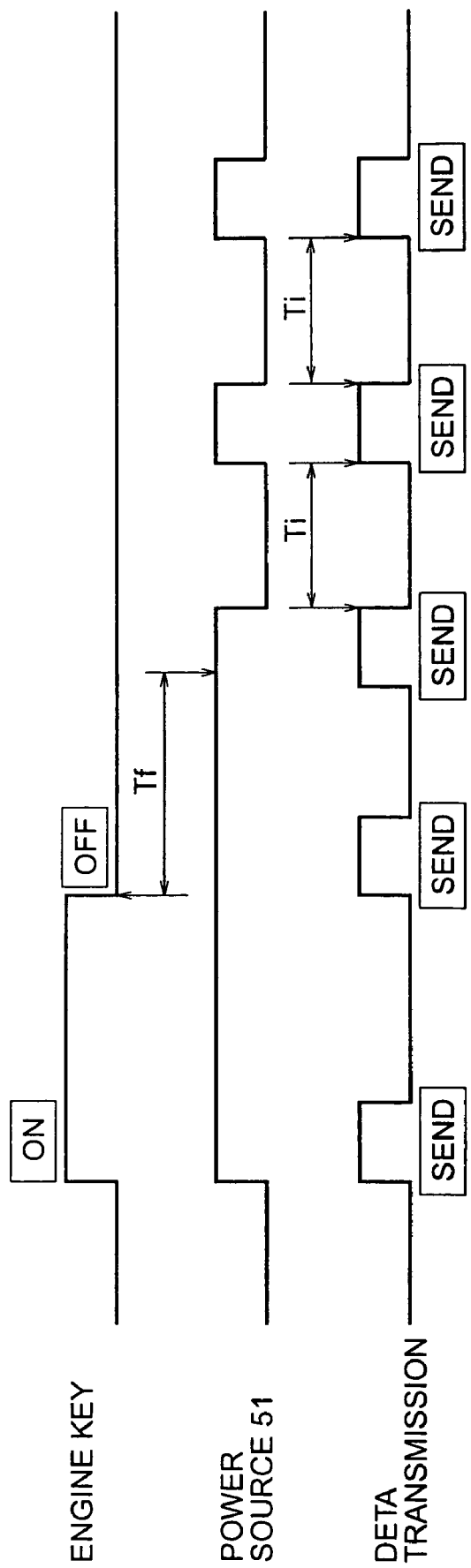
FIG. 10 is a timing chart of a first example of the time intervals of measurement and transmission of location data.

According to the time interval shown in FIG. 10, basically in the same way as the above embodiment, when the engine key is turned to the on position and the power source 51 is turned on, the machine simultaneously measures and sends location data. Afterward, when the engine key is turned to the off position, the power source 51 is kept in a state supplying power for a constant time (Tf) for the machine to measure and send location data. After the power source 51 enters the off state, as explained above, due to the action of the timer circuit 53, the power source 51 is turned on at intervals of a constant time (Ti) and the location data is measured and sent.

Figure 11:
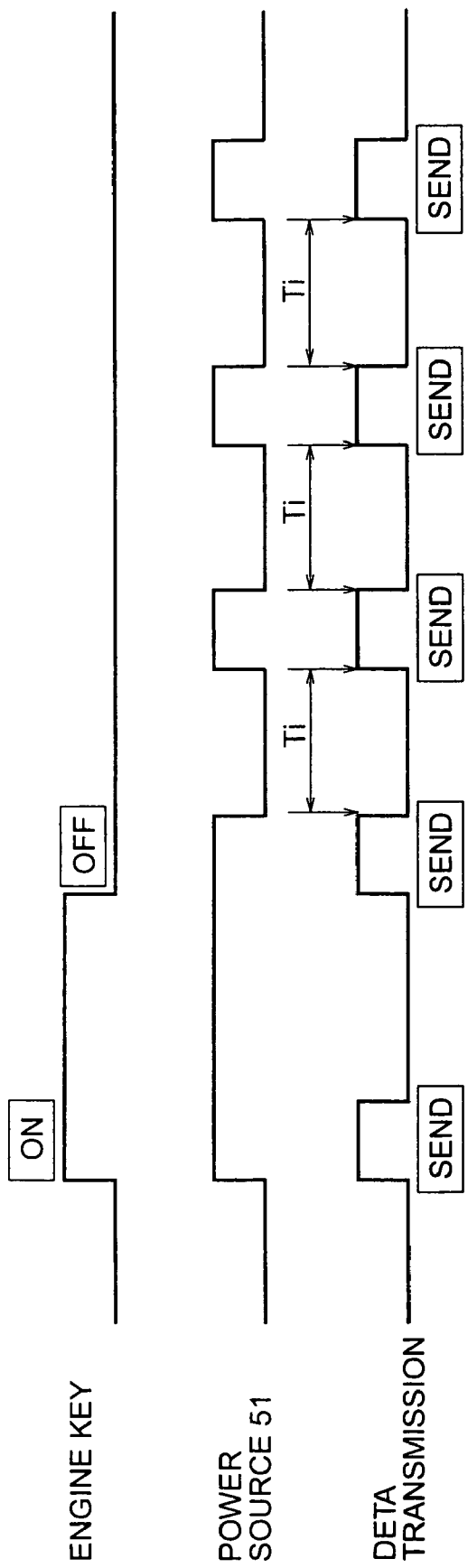
FIG. 11 is a timing chart of a second example of the time intervals of measurement and transmission of location data.

According to the time interval shown in FIG. 11, when the engine key is turned to the on position and the power source 51 is turned on, the machine simultaneously measures and sends location data. Afterward, when the engine key is turned to the off position, the power source 51 is kept in the on state for exactly the time required for measuring and sending location data once, then is turned off. After the power source 51 enters the off state, as explained above, due to the action of the timer circuit 53, the power source 51 is turned on at intervals of a constant time (Ti) and the location data is measured and sent.

Figure 12:
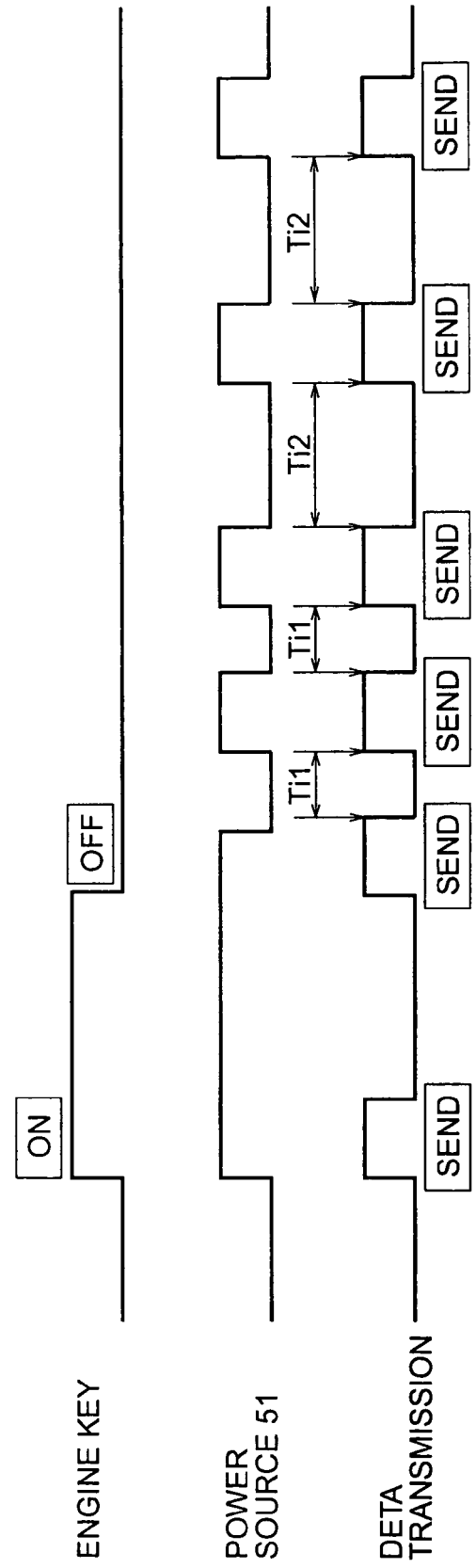
FIG. 12 is a timing chart of a third example of the time intervals of measurement and transmission of location data.

According to the time interval shown in FIG. 12, when the engine key is turned to the on position and the power source 51 supplies power, the construction machine measures and sends its location data. Afterward, when the engine key is turned to the off position, the power source 51 is kept in the on state for exactly the time required for measuring and sending location data once, then is turned off. After the power source 51 enters the off state, as explained above, due to the action of the timer circuit 53, the power source 51 is turned on at intervals of a constant time (Ti) and the location data is measured and sent. After a predetermined time, the time intervals are changed to Ti2 and the power source 51 again turned on to measure and send the location data.

The above embodiment can be changed in the following way. For example, in the embodiment, a "no movement scheduled" button was provided to inform the management server 17 side in advance that there was no schedule of movement by the field 78 of the location movement data format, but the fact of no schedule of movement may also be informed to it in advance utilizing for example a mobile phone.

In the above embodiment, the current location of the hydraulic excavator 1 was measured utilizing GPS, but if the conditions are right, it is also possible to measure the current location utilizing a location information system using a mobile phone or PHS.

Further, regarding the utilization of the map information, there are also web sites providing map information services on the Internet, so it is also possible to utilize that map information for display of the map.

According to the present invention, the construction machine itself deployed at the work site has a GPS device or other locator and functions to measure its own current location and is designed to periodically power up at suitably set time intervals in the inoperative state so as to enable the electrical system to operate, measure the current location, and send it to the center server side, so it is possible to quickly and easily learn the location of a construction machine in an inoperative state. The above time interval can be suitably changed in accordance with the situation, whereby it is possible to extend the battery lifetime or frequently measure and send the current location at the time of theft or other urgent times.

At the center server side (base station side), it is possible to utilize the location data relating to the current location periodically sent so as to manage the location of construction machines and possible to easily obtain a grasp of trends in current locations by marking the location data accompanied with measurement time data on a map. It is possible to provide the location information relating to the current locations on the above map from the center server to the user and therefore the user can obtain an accurate grasp of the state of movement of construction machines it owns or manages. According to the above location confirmation method or location display system, it is possible to prevent theft in advance and, even when theft occurs, to accurately track the location of a machine and thereby quickly deal with theft.

INDUSTRIAL APPLICABILITY

A construction machine at a work site or other far off location periodically measures and calculates its current location data and sends that current location data and measurement time data to a management server. At the management server, it is possible to confirm a change in the location on a map when the construction machine moves, possible to track movement of a construction machine, and able to assist the confirmation of location of a construction machine at a far off location and prevention of theft.

The invention claimed is:

1. A location confirmation method of a construction machine applied to a system comprised of a construction machine provided with a controller, a locator, a first communicator and a power key for controlling a switch that supplies operating electric power when switched on, and a timer circuit for providing an ON control signal for a predetermined period of time and periodically at predetermined intervals of time, to said controller, said locator and said first communicator when said power key is switched off; and a no operation scheduled button for generating data about an operation schedule, and a center server provided with a second communicator, a memory, and a location information provider, said location confirmation method comprising:

supplying at said construction machine electric power to said controller, said locator and said first communicator for operation for said predetermined period of time as determined by said ON control signal that is provided by said timer circuit after said power key is switched off, and sending current location data, measurement time data, and said data about an operation schedule to said center server by said controller and said first communicator if said current location data measured by said locator differs from previously measured location data by a predetermined value during said predetermined period of time, stopping the supply of the electric power to said controller, said locator and said first communicator, and after said predetermined period of time elapses, periodically supplying the electric power to said controller, said locator and said first communicator at predetermined intervals of time as determined by said ON control signal provided by said timer circuit and measuring a current location by said locator at said predetermined time intervals and sending current location data, measurement time data, and said data about operation schedule to said center server by said controller and said first communicator; and receiving at said center server said current location data, said measurement time data, and said data about operation schedule sent from said construction machine at said second communicator and successively storing said current location data, said measurement time data, and said data about operation schedule in said memory and providing location confirmation by said location information provider using said current location data and said measurement time data, and judging an abnormal situation of said construction machine when said location confirmation indicates movement of said construction machine and said data about operation schedule indicates no movement scheduled.

2. A location confirmation method according to claim 1, wherein said center server is provided with map data and marking the location based on said current location data and said measurement time data on a map showing an area including a work site of said construction machine so as to provide said location confirmation.

3. A location confirmation method according to claim 2, wherein in providing said location confirmation, the map shows the state of movement of said construction machine as a discontinuous path of location marks based on said current location data and said measurement time data.

4. A location confirmation method according to claim 1, wherein said location confirmation prepared by said location information provider is provided to a user of said construction machine through a communications line.

5. A location confirmation method according to claim 4, wherein information relating to the provision of said location confirmation is sent to a terminal of said user by e-mail.

6. A location confirmation method according to claim 4, wherein said user accesses said location information provider of said center server from its terminal through the Internet and confirms provision of said location confirmation based on an advance notification from said center server to said user.

7. A location confirmation method according to claim 1, wherein said locator is a GPS device utilizing GPS satellites to measure the current location.

8. A location confirmation method according to claim 1, wherein said predetermined periods of time and said predetermined time intervals are that are set in said construction machine are changeable in accordance with a change in situation.

9. A location display system of a construction machine applied to a system comprised of a construction machine provided with a controller, a locator, a first communicator and a switch switchable between on and off by a power key for controlling supplying of operating electric power, and a timer circuit for providing an ON control signal for a predetermined period of time and periodically at predetermined time intervals, to said controller, said locator and said first communicator when said power key is switched off; and a no operation scheduled button for generating data about an operation schedule, and a center server provided with a second communicator, a memory, and a location information provider, wherein said construction machine supplies operating electric power to said controller, said locator and said first communicator for said predetermined period of time as determined by said ON control signal that is provided by said timer circuit after said power key is switched off, and sends current location data of said construction machine, measurement time, and said data about an operation schedule data to said center server by said controller and said first communicator if said current location data measured by said locator differs from previously measured location data by a predetermined value during said predetermined period of time, stops the supply of the electric power to said controller, said locator and said first communicator, and after said predetermined period of time elapses, periodically supplies the electric power to said controller, said locator and said first communicator at said predetermined intervals of time determined by said ON control signal provided by said timer circuit and measures a current location by said locator at said predetermined time intervals and sends current location data of said construction machine, measurement time data, and said data about an operation schedule to said center server by said controller and said first communicator and said center server receives said current location data of said construction machine, said measurement time data, and said data about an operation schedule sent from said construction machine at said second communicator, successively stores said current location data, said measurement time data, and said data about an operation schedule in said memory, provides location marks of a current location on a map using said current location data and said measurement time data by said location information provider, and judges an abnormal situation of said construction machine when said location confirmation indicates movement of said construction machine and said data about operation schedule indicates no movement scheduled.

10. A location display system according to claim 9, wherein the location marks relating to said current location are provided so that the state of movement of said construction machine is displayed on the map as a discontinuous path of the location marks based on said current location data and said measurement time data.

11. A location display system according to claim 9, wherein the location marks relating to said current location provided by said location information provider are provided to a user of said construction machine through a communications line.

12. A location display system according to claim 9, wherein information on the location marks according to said current location is sent to a terminal of said user by e-mail as an attached file.

13. A construction machine, comprising:

a controller for controlling operations of the construction machine, a locator for measuring a current location of said construction machine, and a communicator for communicating with an external base station;

a switch and a power key switchable between on and off;

an electric power supply for supplying operating electric power to said construction machine when said power key is switched on;

a timer circuit for providing an ON control signal, after said power key is switched off to provide electric power from said electric power supply to said controller, said locator and said communicator for a predetermined period of time;

a no operation scheduled button for generating data about an operation schedule;

said communicator sending current location data, measurement time data, and said data about an operation schedule during said predetermined period of time to said center sewer if said current location data measured by said locator differs from previously measured location data by a predetermined value; and said timer circuit providing said ON control signal periodically to provide electric power from said electric power supply to said controller, said locator and said communicator for measuring the current location at predetermined time intervals after said predetermined period of time elapses and sending current location data, measurement time data, and said data about an operation schedule to the base station by said controller and said communicator and said controller judges an abnormal situation of said construction machine when said location confirmation indicates movement of said construction machine and said data about operation schedule indicates no movement scheduled;

wherein the operation for measurement and transmission of the current location in the non-operative state of said construction machine is set to be effective for a predetermined term.

14. A construction according to claim 13, wherein said locator is comprised of a GPS device utilizing GPS satellites to measure its current location.

15. A construction machine according to claim 13, wherein said predetermined time intervals are variable in accordance with changes in the situation.

16. A construction machine according to claim 13, wherein the data sent to said base station includes data relating to a schedule of movement and a change in current location is judged to be normal or abnormal based on the data relating to the schedule of movement.

17. A construction machine according to claim 13, wherein said circuit includes a power key for controlling switching between on and off.

* * * * *